United States Patent [19]

Yoshikane

[11] 4,254,499
[45] Mar. 3, 1981

[54] SIGNAL TRANSMISSION SYSTEM IN A DIGITAL CONTROLLER SYSTEM

[75] Inventor: Akishige Yoshikane, Choufu, Japan

[73] Assignee: Tokyo Shibaura Denki Kabushiki Kaisha, Kawasaki, Japan

[21] Appl. No.: 48,071

[22] Filed: Jun. 13, 1979

[30] Foreign Application Priority Data

Jun. 28, 1978 [JP] Japan .................................. 53-77386

[51] Int. Cl.³ ............................................. H04J 3/00
[52] U.S. Cl. ...................................... 370/85; 370/79; 370/13; 371/34
[58] Field of Search .................... 370/85, 92, 79, 29, 370/13, 15; 364/200; 371/34

[56] References Cited

U.S. PATENT DOCUMENTS

| | | | |
|---|---|---|---|
| 3,634,830 | 1/1972 | Baskin | 364/200 |
| 3,699,525 | 10/1972 | Klavins | 364/200 |
| 3,843,834 | 10/1974 | Burke | 179/170.2 |
| 3,995,258 | 11/1976 | Barlow | 371/34 |
| 4,097,695 | 6/1978 | Grace et al. | 370/92 |
| 4,118,772 | 10/1978 | Takada | 364/200 |

Primary Examiner—Douglas W. Olms
Attorney, Agent, or Firm—Oblon, Fisher, Spivak, McClelland & Maier

[57] ABSTRACT

A digital controller system with a hierarchy organization having a high level control section, a plurality of low level control sections which are monitored and controlled by the high level control section, and a plurality of loop station means connected to each low level control section for transmitting signals directly to a process variable circuit and receiving signals directly from the process variable circuit, a signal transmission system in which return and collation are effected for every word in the data transmission between the loop station means and the low level control sections, and return and collation for every word and transfer for every block are selectively carried out in the data transmission between the low level control sections and the high level control section.

4 Claims, 5 Drawing Figures

SIGNAL TRANSMISSION SYSTEM IN A DIGITAL CONTROLLER SYSTEM

BACKGROUND OF THE INVENTION

1. Field of the Invention

This invention relates to signal transmission systems in digital controller systems, and more particularly to a signal transmission system in such a digital controller system in which the signal transmission efficiency is improved.

2. Discussion of the Prior Art

A conventional instrumentation system comprises analog instruments and controlling computers. Recently, a digital control system utilizing a microcomputer as its indicating controller has been put in practical use. In the digital control system, a variety of accurate functions, which cannot be provided by a conventional analog indicating controller, are provided for the instrumentation system (cf. U.S. Pat. No. 4,118,772).

In the control system, a hierarchy system is established. More specifically, the system comprises a high level control section, a plurality of low level control sections which are monitored and controlled by the high level control section, and a plurality of loop station means connected to each of the low level control sections. In the signal transmission between these elements, the high level control section has precedence over the others. In order to minimize transmission errors, a return and collation system is employed for the signal transmission. For instance, in the data transmission between the low level control section and the loop station means, first a relevant instruction is transmitted from the low level control section to the loop station means. Upon receiption of the instruction, the loop station means returns the instruction, as it is, to the low level control section. The low level control section subjects the instruction thus returned to collation to determine if it is identical to the initial one, and then transmits the instruction to the loop station means again. Alternatively, the loop station means collates the instruction transmitted thereto with the instruction transmitted initially thereto to determine if these two instruction are equal in content, and receives the instruction only when the two instructions are determined identical. The same operation as described above is carried out in the case of data transmission between the high level control section and the low level control section.

However, the system suffers from a difficulty that, since the return and collation system is employed for data transmission, the data transmission efficiency is low.

Furthermore, in the case of an integrated direct digital control (DDC) system combined with a cathode ray tube display unit, the quantity of data to be processed is considerably increased. Therefore, the conventional signal transmission system is disadvantageous in that the processing rate is necessarily low.

SUMMARY OF THE INVENTION

Accordingly, an object of this invention is to provide a signal transmission in a digital controller system whose data transmission efficiency is improved.

Another object of the invention is to provide a signal transmission in a digital controller system whose data transmission efficiency is improved without lowering the data transmission accuracy.

The foregoing objects and other objects of the invention have been achieved by the provision of a signal transmission system for a digital controller system, in which, according to the invention, in addition to the return and collation system effected for every word the block transfer system is employed, as required, in the data transmission between the high level control section and the low level control section.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
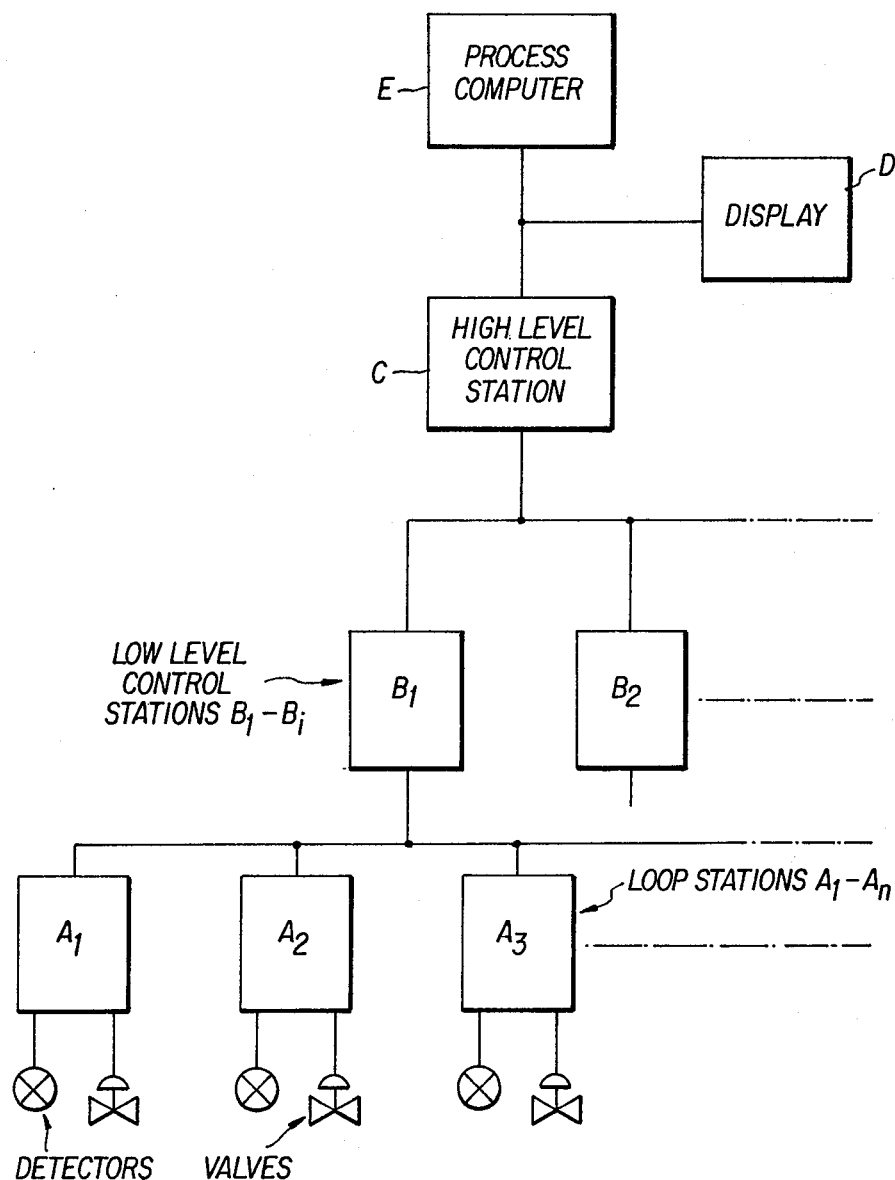
FIG. 1 is a block diagram showing one example of a digital control system realizing a computer hierarchy.

Referring now to the drawings, wherein like reference numerals designate identical or corresponding parts throughout the several views, and more particularly to FIG. 1 thereof, which is a block diagram showing one example of a digital control system realizing a computer hierarchy, the digital control system is seen to include loop station means A1, A2, A3, . . . An connected to process detectors such as temperature detectors and operating terminals such as valves. The loop station means A1, A2, A3, . . . An are connected to a low level control section B1 which includes a microcomputer and has a variety of control algorisms. The digital control system further comprises many other low level control sections B2, B3, . . . Bi which are similar to the above-described low level control section B1, and a high level control section C having a microcomputer. The high level control section C collectively carries out the operation of the system for the collective control of the low level control sections B1, B2, . . . Bi. The high level control section C is connected to the low level control sections B1, B2, . . . In the case of a large scale instrumentation system, the digital control system further comprises a CRT (cathode ray tube) display unit D, and a process computer E.

In the digital control system described above, the high level control section C will be referred to merely as "DDAS (direct digital access station)", the low level control sections B1, B2, . . . will be referred to merely as "DDCS's (direct digital control stations)," and the loop station means A1, A2, A3, . . . will be referred to merely as "DDLS's (direct digital loop stations)" when applicable.

At most eight DDCS's are connected to one DDAS, and at most eight DDLS are connected to one DDCS.

The DDLS is provided for every control loop. The DDLS receives a process variable from the process and transfers it to its DDCS. According to the control calculation result of the DDCS, the DDLS applies an operating terminal drive output signal to the operating terminals. The DDCS displays the process variable, a desired value and the operating terminal drive output signal, and has a DDCS backup function effected when the DDCS becomes out of order.

Thus, the computer hierarchy can be readily provided by this digital control system. Furthermore, the digital control system has a wide range of application from a small loop control system to a large scale instrumentation system. In addition, with the digital control system, troubles encountered with the instrumentation system can be minimized.

In this invention, the data transmission between a DDAS and DDCS's is effected in a block transfer mode when required, and the data transmission between DDCS's and DDLS's is carried out according to a data transmission system in which return and collation are effected for every word.

Figure 2:
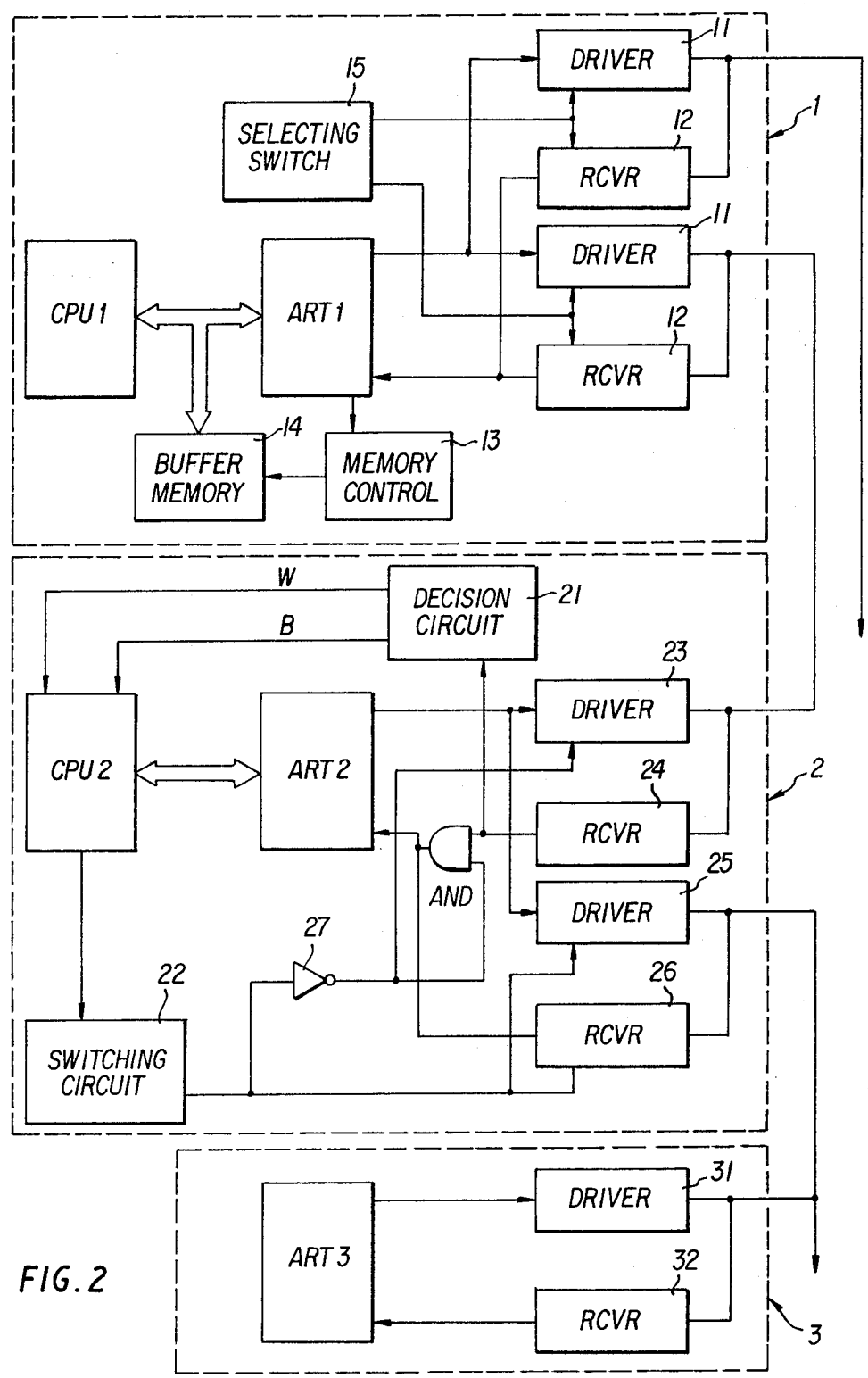
FIG. 2 is a block diagram showing the essential components of a digital controller system employing a signal transmission system according to this invention.

This will be described with reference to FIG. 2, in which reference numerals 1, 2 and 3 designates the DDAS, the DDCS, and the DDLS, respectively. It should be noted that the circuits which are not directly related to the signal transmission are not shown in FIG. 2, and individual components in FIG. 2 are conventional ones.

In the DDAS 1, paired drivers 11 and receivers 12 are provided in correspondence to the number of DDCS's. Unlike between the DDCS and the DDLS, between the DDAS and the DDCS no data bus is employed. Accordingly, it is necessary to provide the drivers 11 and receivers 12 according to the number of DDCS's, in the DDAS. This is due to the fact that, if a data bus is employed between the DDAS and the DDCS, then it is necessary to provide an address for an instruction signal from the DDAS for every DDCS.

These drivers 11 and receivers 12 are connected to an asynchronous receiver transmitter ART1. The receivers 12 receive signals from the DDCS's and apply them to the asynchronous receiver transmitter ART1, which in turn applies signals to the drivers 11, as a result of which signals are applied to the respective DDCS's by the drivers 11.

The DDAS 1 comprises a central processing unit CPU1 made up of a microcomputer, which is provided for collective control, and for interlinkage with a high level computer. In the central processing unit CPU1, an input signal applied thereto from the asynchronous receiver transmitter ART1 is subjected to a predetermined process. The process result is applied to a respective DDCS through a driver 11 which has been selected by a selecting switch 15.

The DDAS 1 further comprises: a buffer memory 14 which operates to receive and store block transfer signals from the DDCS; and a memory control circuit 13. Upon application of a data signal block-transferred from the DDCS 2, the memory control circuit 13 operates to add a predetermined address to the data signal applied thereto through the asynchronous receiver and transmitter ART1 and to cause the buffer memory 14 to store the data signal thus treated.

The elements provided in the DDAS 1 are conventional ones.

The DDCS 2 has a central processing unit CPU 2. The DDCS 2 receives process data from the DDLS 3 and subjects the data to a control operation and alarm process. The result of the process is applied to the DDLS 3. Furthermore, the DDCS 2 operates to transmit the change of a desired value or the like to the DDLS 3. The DDCS is connected to the DDLS through an analog bus and a digital bus. However, it should be noted that only the parts relating to the transfer by the digital bus are shown in FIG. 2. Analog signals such as process variable signals are transmitted over the analog bus.

In the DDCS 2, a driver 25 and a receiver 26 in pair are provided for receiving signals from the DDLS 3 and for transmitting signal thereto. Furthermore, the DDCS 2 comprises a switching circuit 22 operating to switch the application of the output of the central processing unit CPU2 to the DDAS 1 and the DDLS 3. For transmission of data between the DDLS and the DDCS, a receiver 24 and the driver 23 are used.

At most eight DDLS's are connected to the DDCS 2 through a bus line. Accordingly, an address is specified in the output signal of the DDCS 2 so that the signal is applied to a selected one of the DDLS's 3. In the case when signal transmission is effected between the DDCS 2 and the DDLS 3, a signal from the DDLS 3 is applied through the receiver 26 to an asynchronous receiver transmitter ART2. Then, the signal is processed in the central processing unit CPU2, and is then applied through the asynchronous receiver transmitter ART2 and the driver 25 to the DDLS 3. In the data transfer between the DDLS and the DDCS, return and collation are effected for every word.

The DDCS further comprises a decision circuit 21 which is provided for signal transmission between the DDCS and the DDAS. The decision circuit 21 operates to decide whether an input from the DDAS 1 is a block transfer instruction or a word-by-word transfer instruction. Thus, in accordance with a transmission system which has been determined by the decision circuit, the process result of the central processing unit CPU2 is applied the asynchronous receiver transmitter ART2 and a driver 23 to the DDAS 1.

In the case of signal transmission between the DDCS and the DDAS, the switching circuit 22 is operated by a signal applied thereto from the central processing unit CPU2, and a signal from the receiver 24 is applied to the CPU2 through an AND circuit AND1 with the aid of the operation of an inverter 27.

In FIG. 2, reference numeral 3 designates the DDLS, and in particular the digital signal transmitting section thereof, as shown. The DDLS comprises a receiver 32 for receiving signals from the DDCS 2, a driver 31 for transmitting signals to the DDCS 2, and an asynchronous receiver transmitter ART3.

In the data transmission between the DDCS 2 and the DDLS 3, the output of the DDLS 3 directly controls the plant, and therefore the effect of transmission miss cannot be neglected. Accordingly, the data transmission is carried out in accordance with a return and collation system.

On the other hand, in the data transmission between the DDAS 1 and the DDCS 2 the quantity of transmission is considerably large. Accordingly, in order to increase the transmission efficiency, the return and collation system and the block transfer system are selectively employed for the data transmission as the case may be.

The term "return and collation for every word" as herein used is intended to mean that, in transmitting the information of one word, a receiving side which has received the signal returns the signal, as it is, to a transmitting side which has transmitted the signal, and after it is confirmed in the transmitting side that the signal thus returned coincides with the original one, the receiving side utilizes it as the information.

The data transmission between the DDCS and the DDLS will be described.

The relation in number between the DDCS and the DDLS is as 1:n (n≦8). The data transmission between the DDCS and the DDLS's is effected in a serial transmission system in a time division manner. The fundamental transmission arrangement of the asynchronous receiver transmitter is of twelve (12) bits consisting of a start bit (1 bit), eight-bit data, a parity (1 bit) and stop bits (2 bit).

TABLE 1

| | 0 1 2 3 4 5 6 7 |
|---|---|
| FL1 DDCS → DDLS | 0 1 \| Address \| Index |
| FL2 DDCS → DDLS | 1 0 \| ← Data → |
| FL3 DDCS ← DDLS | 1 0 \| ← Data → |
| FL4 DDCS → DDLS | 1 0 \| Address \| Index |

In transmitting information from the DDCS to the DDLS, as indicated in Table 1 above, first in FL1 a signal for specifying a desired one of the DDLS's, and then the signal is stored once in the DDLS, and thereafter data is transferred to the DDLS from the DDCS in FL2. The DDLS returns the data of FL2 to the DDCS in FL3. In the DDLS, the signal returned from the DDLS in FL 3 is compared with the signal transmitted to the DDLS in FL2, and when both coincide with each other, a signal selecting the DDLS, i.e., the data of FL4 which is identical to the data of FL1 is transmitted to the DDLS. In the DDLS, when the data of FL1 is equal to the data of FL4, the DDLS itself is specified, and the data of FL2 is recognized as the signal from the DDCS, and is processed.

The block transfer of data between the DDAS and the DDCS will be described.

In the central processing unit CPU1 of the DDAS, the selecting switch 15 is operated to select the driver 11 and receiver 12 corresponding to a DDCS 2 to which data should be transferred. Furthermore, the central processing unit CPU1 transmitts an instruction signal S1 that the data transfer is carried out by the block, to the DDCS through the asynchronous receiver transmitter ART1 and the driver 11.

The DDCS 2 receives it through the receiver 24, and applies it to the decision circuit 21 and the AND circuit AND1. The decision circuit 21 determines whether the word transfer according to the return and collation system should be carried out or the block transfer should be carried out, and interrupts the central processing unit CPU2. In response to the interruption, the central processing unit CPU2 operates the change-over switch 22 so that the signal reception is for the DDCS, with the result that the output signal "0" through the change-over switch 22 is applied through the inverter 27 to the driver 23 and the AND circuit AND1. Thus, the instruction signal from the DDAS 1 is supplied to the asynchronous receiver transmitter ART2 and the central processing unit CPU2 in the DDCS 2, from which an answer signal S2 is applied to the DDAS. As a result, the DDAS 1 issues an instruction signal S3 for a specified word. Upon reception of the instruction signal S3, the DDCS delivers all of the data S4 of the request address of the instruction signal S3.

TABLE 2

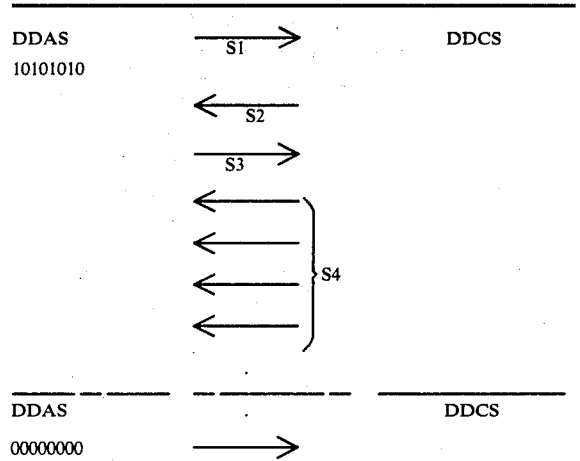

The above-described signals are as indicated in Table 2 above. In the example described above, the decision is carried out with the aid of a signal "10101010" in the case of the block transfer, and a signal "00000000" in the case of the return and collation for every word.

In the case where the block transfer request from the central processing unit CPU1 is applied to the DDCS 2, the DDAS 1 operates to input the data from the DDCS 2 into the buffer memory through the asynchronous receiver transmitter ART1 and to cause the buffer memory to store the data thus inputted, under the control of the memory control circuit 13. Thus, irrespective of the central processing unit CPU1, the information from the asynchronous receiver transmitter ART1 is written directly into the buffer memory. During this period, the central processing unit CPU1 carries out other operations.

As is apparent from the above description, if the parity bit is utilized in association with "a check-sum-word-operation" described below, then the transmission miss in the block transfer can be sufficiently eliminated. The term "check-sum-word-operation" is intended to mean the operation in which the number of bits having, for instance, a logic level "1" transmitted by a transmitting side and the number of bits at the logic level "1" received by a receiving side are subjected to collation for coincidence.

In the above-described example, the block transfer is not employed for the data transmission from the DDAS to the DDCS due to the following reason: As the DDAS has precedence in control over the others, the return and collation for every word is necessary for the instruction from the DDAS so as to improve the accuracy of control.

Figure 3:
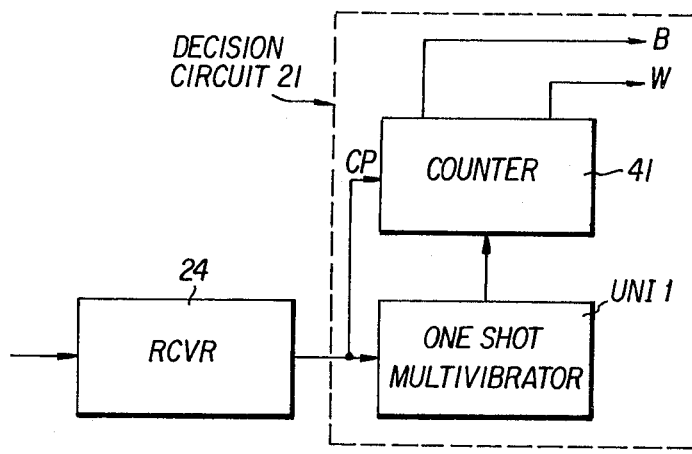
FIGS. 3 and 4 are also block diagrams showing examples of a decision circuit in a low level control section of the digital controller system employing the signal transmission system according to the invention and FIG. 5 is a diagram of selected waveforms illustrating the operation of the decision circuit shown in FIG. 4.

FIG. 3 shows one example of the decision circuit 21 employed in practicing the signal transmission system according to the invention.

The signal from the receiver 24 is applied to a 400 μsec unit UNI1 and the clock pulse terminal of a counter 41. The output of the unit UNI1 operates to reset the counter 41. In the case where the block transfer instruction signal S1 is applied from the DDAS 1 to the DDCS 2, it takes about 384 μsec to input a signal of twelve (12) bits in total including the eight (8) bits of the data. Therefore, the counter is operated only for 400

μsec after the signal is inputted, so that the number of input signals at the logical level "1" is counted for this period of time, thereby to determine whether or not the input signal is the instruction signal S1.

Figure 4:
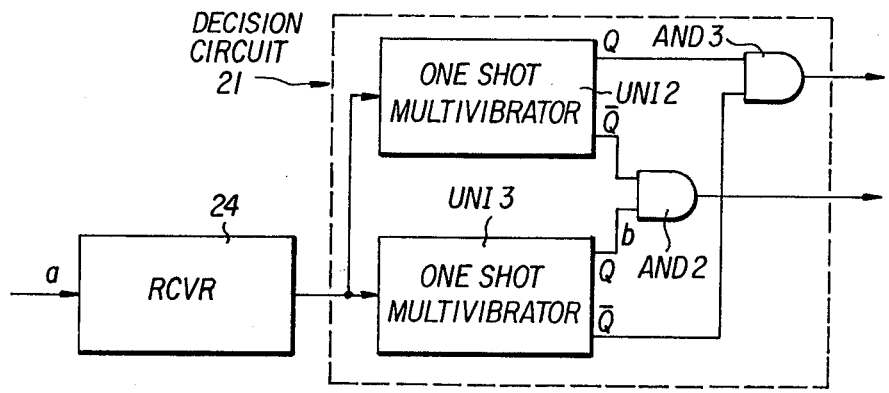

FIG. 4 shows another example of the decision circuit, which comprises a retriggerable one-shot multivibrator UNI2 receiving the output of the receiver 24. The vibrator UNI2 maintains its output state unchanged if the input is still maintained at the logical level "1" in 150 μsec. Therefore, if the level of the input is changed from the logic level "1" to the logic level "0," for instance, in 100 μsec, then the output state of the vibrator UNI2 is inverted. The decision circuit shown in FIG. 4 further comprises a 400 μsec unit UNI3 which operates similarly as in the unit UNI1 in FIG. 3.

Figure 5:
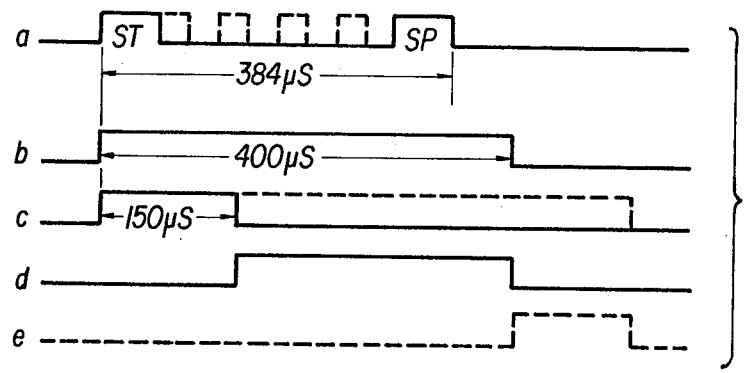

The operation of the decision circuit shown in FIG. 4 will be described in more detail with reference to FIG. 5. When an input signal shown in the part a of FIG. 5 is applied to the units UNI2 and UNI3 through the receiver 24, the unit UNI3 outputs a signal shown in the part b of FIG. 5. In the vibrator UNI2, the level of the signal inputted thereto is detected every 150 μsec, and if it is detected as identical, then the initial signal level is maintained. Accordingly, in the case of an input signal as indicated by the dotted lines in the part a of FIG. 5, i.e., in the case of the block transfer instruction, a level as indicated by the dotted line in the part c of FIG. 5 is maintained, and the decision circuit provides an output as shown in the part e of FIG. 5. In the case of the application of an input signal as shown in the part a of FIG. 5, then the decision circuit provides an output as shown in the part d of FIG. 5. Thus, one of the block transfer and the return and collation for every work is determined in the manner as described above.

The DACS 2 has only one asynchronous receiver transmitter ART1. Therefore, with the data transmission instruction from the DDAS 1, the central processing unit CPU2 generally carries out transmission to the DDLS 3 for control. Accordingly, in this case, the transmission line from the DDAS 1 is in "off" state, and it is impossible to decide the data with the asynchronous receiver transmitter ART. Therefore, it is necessary to effect the above-described interruption. However, if two asynchronous receiver transmitters ART2 are provided separately for the DDAS and the DDLS, respectively, then a data pattern received by the asynchronous receiver transmitter can be used as it is.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A signal transmission system in a digital controller system comprising a high level control section, a plurality of low level control sections which are monitored and controlled by said high level control section; and a plurality of loop station means connected to each low level control section, said plurality of loop station means transmitting signals directly to a process variable circuit and receiving signals directly from the process variable circuit, in which return and collation are effected for every word in data transmission between said loop station means and said low level control sections, and return and collation for every word and transfer for every block are selectively carried out in data transmission between said low level control sections and said high level control section.

2. A signal transmission system as claimed in claim 1, in which said transfer for every block is effected from said low level control sections to said high level control section in response to an instruction from said high level control section.

3. A signal transmission system as claimed in claim 1, in which said high level control section comprises: a central processing unit; a synchronous receiver transmitter coupled to said central processing unit; a plurality of paired drivers and receivers which are provided in correspondence to said low level control sections and are connected to said asynchronous receiver transmitter; selecting means for selectively driving said plurality of paired driver and receivers in response to a signal from said central processing unit; a buffer memory connected to said central processing unit, for storing data from said asynchronous receiver transmitter.

4. A signal transmission system as claimed in claim 1, in which each of said low level control sections comprises: a central processing unit; at least one asynchronous receiver transmitter connected to said central processing unit; a driver and a receiver in one pair having first terminals connected to said asynchronous receiver transmitter and second terminals connected to said high level control circuit; a driver and a receiver in one pair having first terminals connected to said asynchronous receiver transmitter and second terminals connected to said plurality of loop station means; a decision circuit for deciding whether signal transmission is effected in word transfer or in block transfer with the aid of a signal supplied thereto through said receiver connected to said high level control section, to provide a decision result signal which is applied to said central processing unit; and selecting means for selecting said driver and receiver connected to said high level control section or said driver and receiver connected to said loop station means according to a signal from said central processing unit.

* * * * *